United States Patent [19]

Shak et al.

[11] Patent Number: 4,617,606
[45] Date of Patent: Oct. 14, 1986

[54] CAPACITIVE PRESSURE TRANSDUCER

[75] Inventors: Peter J. Shak; Roland K. Ho, both of Hoffman Estates, Ill.

[73] Assignee: Motorola, Inc., Schaumburg, Ill.

[21] Appl. No.: 696,933

[22] Filed: Jan. 31, 1985

[51] Int. Cl.[4] ............................................. G01L 9/12
[52] U.S. Cl. .................................... 361/283; 73/718
[58] Field of Search ................... 73/718, 724; 361/283

[56] References Cited

U.S. PATENT DOCUMENTS

| | | | |
|---|---|---|---|
| 2,436,208 | 2/1948 | Dressel | 361/301 X |
| 3,489,845 | 1/1970 | Landron | 174/52 |
| 3,715,638 | 2/1973 | Polye | 361/274 |
| 3,969,816 | 7/1976 | Swengel, Sr. et al. | 29/879 |
| 4,030,347 | 6/1977 | Norris et al. | 73/769 |
| 4,084,438 | 4/1978 | Lee et al. | 73/716 X |
| 4,151,578 | 4/1979 | Bell | 361/274 X |
| 4,158,217 | 6/1979 | Bell | 361/283 |
| 4,266,091 | 5/1981 | Fukuda | 174/72 |
| 4,342,881 | 8/1982 | Fukuda | 174/72 |
| 4,345,299 | 8/1982 | Ho | 361/283 |
| 4,384,899 | 5/1983 | Myers | 148/1.5 |
| 4,424,713 | 1/1984 | Kroninger et al. | 73/718 |
| 4,445,383 | 5/1984 | Binder et al. | 73/718 |

FOREIGN PATENT DOCUMENTS

2059071  4/1981  United Kingdom .................. 73/724

Primary Examiner—Donald A. Griffin
Attorney, Agent, or Firm—Phillip H. Melamed

[57] ABSTRACT

A capacitive pressure transducer is disclosed in which a preformed metallic component is embedded in a non-conductive base substrate and acts as a first capacitor electrode. A silicon diaphragm acts as a second pressure sensing capacitor electrode whose spacing from the first electrode is determined by sensed pressure. The preformed metallic component forming the first capacitor electrode has an integral projecting portion which extends through the base substrate and provides an externally accessible electrical connection to the first electrode. A top external surface of the first electrode is ground flat so that it is coplanar with surrounding coplanar portions of a top surface of the base substrate. An additional preformed metallic conductor means is embedded in the base substrate and provides an externally accessible bottom side connection to the silicon diaphragm which is bonded to the base top surface. In some embodiments, the integral projecting portion of the first electrode has a through path opening therein to provide external access to an internal cavity formed by the silicon diaphragm, the external top surface of the base electrode and coplanar portions of the top surface of the base which surround the first electrode top external surface. Pressure transducers constructed in accordance with the present invention are more reliable and less costly because of elimination of prior techniques used to provide the base substrate electrode and the electrical feedthrough connections through the base substrate. In addition, repeatability of pressure transducers constructed in accordance with the present invention is enhanced.

16 Claims, 6 Drawing Figures

CAPACITIVE PRESSURE TRANSDUCER

BACKGROUND OF THE INVENTION

The present invention is related to the field of pressure transducers, and more particularly to capacitive pressure transducers in which sensed pressure causes a predetermined capacitance by altering the spacings between electrodes of a variable capacitor having at least one electrode on a pressure displaceable diaphragm. The capacitance is then utilized to provide an electrical signal representative of the sensed pressure.

Capacitive pressure transducers are known which comprise an etched portion of silicon acting as a pressure sensing diaphragm and also as one electrode of the capacitive pressure transducer. Typically, the other electrode of the capacitive transducer comprises metallization deposited on an insulating base substrate which is many times thicker than the etched silicon diaphragm. U.S. Pat. No. 4,384,899 to Myers, and assigned to the same assignee as the present invention, illustrates such a structure and describes how anodic bonding techniques can be beneficially utilized to bond the insulating base substrate to the silicon diaphragm.

In manufacturing the pressure transducers described in the above noted Myers patent, the capacitive electrode on the base substrate comprises a film metallization which is deposited on an external surface of the base substrate to form a desired base electrode pattern. Subsequently the silicon diaphragm is bonded to the base substrate with a recessed portion of the silicon diaphragm spaced apart from and facing the film metallization layer on the base substrate. This results in effectively surrounding the base substrate electrode by the silicon diaphragm. Since electrical contact must be made to the base substrate capacitive electrode, typically film metallization is deposited in a through hole in the base substrate thereby providing an accessible external electrical connection to the base substrate electrode (comprising the film metallization on the external surface of the base substrate).

The above noted Myers patent discusses in detail a beneficial anodic bonding technique which advantageously bonds the silicon diaphragm to nonconductive peripheral portions of the base external surface which surround the base film metallization that forms one of the capacitor electrodes. The Myers structure illustrates the use of film metallization for the base electrode, and also for providing a feedthrough connection through the base substrate. Providing these film metallizations is costly since they require complex manufacturing processes and costly and complex equipment. Typically the film metallization is provided by a thin film evaporation or RF sputtering technique. This technique also involves either utilization of an appropriate mask or utilization of photographic coat, expose, develop and etching techniques to define the pattern of the film metallization forming the base electrode. In addition, depositing film metallization in the through hole of the base substrate to provide a feedthrough connection for providing external access to the base electrode has proved to be somewhat difficult to reliably implement.

In addition to the above noted deficiencies of the prior capacitive transducers, accuracy of the film metallization electrode pattern must be precisely controlled, since this will determine the nominal capacitance provided by the pressure transducer. Only pressure transducers which fall within a narrow range of nominal capacitance would be useable in most applications. Also, typically it is desired to provide a nominal capacitance for the pressure transducer which is as large as possible. This results in having the recessed portion of the silicon diaphragm spaced very close to the film metallization comprising the base substrate electrode. Therefore even minor variations in the thickness of this film metallization could substantially effect the nominal capacitance of the pressure sensor. The anodic bonding technique described in the above noted Myers patent was developed to minimize the problem of variation of nominal capacitance, as well as other problems, caused by the previous utilization of an interface bonding material between the base substrate and the silicon diaphragm. However, still precise control must be used in the film metallization process to ensure proper nominal capacitance and to minimize feedthrough reliability problems. This adds to the cost of such prior transducers.

SUMMARY OF THE INVENTION

An object of the present invention is to provide an improved capacitive pressure transducer which overcomes the above noted disadvantages of prior transducers.

A more particular object of the present invention is to provide an improved pressure transducer in which a more reliable and less expensive feedthrough connection is provided between a base substrate capacitor electrode and an externally accessible conductor location.

In one embodiment of the present invention a capacitive pressure transducer is provided. The capacitive pressure transducer comprises: a nonconductive base having external top and other surfaces, a conductive first capacitive electrode bonded to said base and having a top external surface forming part of said base external top surface, the first electrode top external surface effectively substantially surrounded by nonconductive coplanar portions of said base top surface, and diaphragm means having top and bottom surfaces with said diaphragm bottom surface joined to said base top surface, a recessed portion of said diaphragm bottom surface spaced apart from and facing said first capacitive electrode top external surface and forming a second capacitive electrode movable with respect to said first electrode in response to sensed pressure variations, coplanar nonrecessed portions of said diaphragm bottom surface peripheral to said recessed portion being bonded to said nonconductive coplanar portions of said base top surface, said first electrode comprising a preformed metallic component embedded in said base, said first electrode top external surface being coplanar with said base top surface nonconductive coplanar portions, and said first electrode having a conductive projecting portion, effectively integral with said first electrode top external surface, embedded in said base and effectively extending from said first electrode top external surface through said base to at least said base other surface.

The preferred embodiment of the present invention comprises the above recited capacitive pressure transducer in which the first electrode comprises a preformed metal pin having an extended nail head end portion forming said capacitive electrode top external surface, and wherein said integral projecting portion of the first electrode comprises an integral metal extension of a smaller cross sectional dimension which extends through said base effectively from the top external surface of the base electrode to at least, preferably, a bottom surface of the base which is parallel to the base top surface. In this manner, a reliable connection to the base electrode is provided since the base electrode and its external feedthrough connection are integral with one another and preferably comprise a preformed metal component with an extended head portion. Also the costly and complex film metallization process previously used to form the base electrode and the feedthrough has now been completely eliminated resulting in a substantial reduction in the cost of manufacturing capacitive pressure transducers. Preferably the extended head portion and surrounding coplanar portions of the base top surface are ground flat so that they are coplanar with each other. This minimizes capacitance variations which were present in previous transducers due to variations in the spacing between the film electrode metallization previously utilized for the capacitor base electrode and the silicon diaphragm electrode.

According to additional aspects of the present invention, an additional preformed metallic pin feedthrough in the base is utilized to provide a direct electrical connection, through the base, from the base bottom surface to the conductive silicon diaphragm which forms the recited diaphragm means. Another aspect of the present invention involves providing the first electrode integral projecting portion, which extends through the base and provides an electrical feedthrough for the base electrode, with a through path opening present within this projecting portion. This through path opening extends from at least the base other surface (preferably the bottom surface of the base) into an internal cavity bounded by the recessed portion of the diaphragm means, the first electrode top external surface and portions of the coplanar base top surface portions which surround the first electrode top external surface. In this manner access is provided to this internal cavity so that either a predetermined reference pressure can be accurately stored therein, or the pressure transducer can be utilized as a differential pressure transducer measuring the pressure difference between the pressure within the cavity and the pressure applied external to the cavity which therefore bears upon the external top surface of the diaphragm means.

These and other aspects of the present invention can best be understood by referring to the subsequent description of the preferred embodiments.

BRIEF DESCRIPTION OF THE DRAWINGS

For a more complete understanding of the invention, reference should be made to the drawings, in which.

DESCRIPTION OF THE PREFERRED EMBODIMENTS

Figure 1:
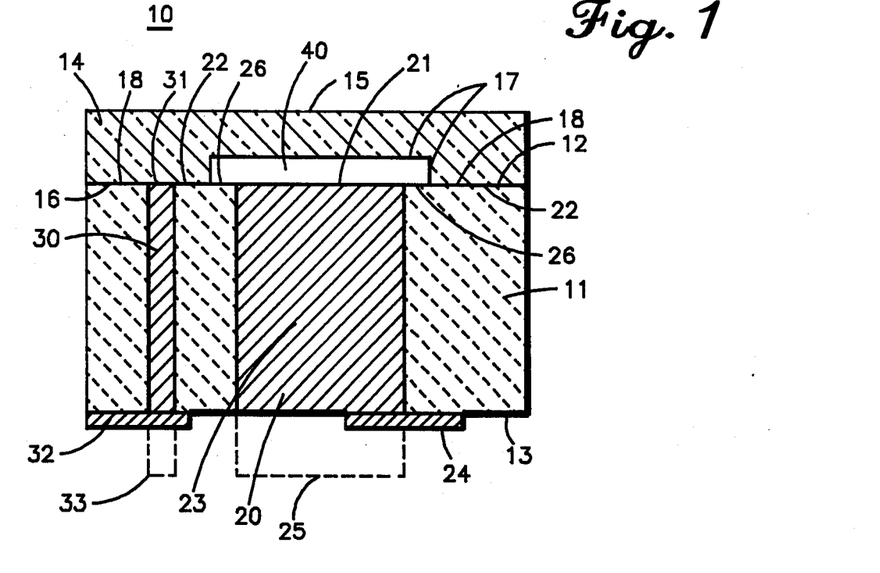
FIG. 1 is a cross sectional view of a pressure transducer.

FIG. 1 illustrates a cross sectional view of a capacitive pressure transducer 10. The transducer comprises a nonconductive base substrate 11, preferably glass, having an external top surface 12 and a spaced apart and parallel external bottom surface 13. The transducer 10 also includes a conductive diaphragm 14, which is preferably made of silicon which is either suitably doped or will be suitably biased to render it conductive during its pressure sensing function. The diaphragm 14 has an external top surface 15 and a bottom surface 16. The bottom surface 16 has a recessed portion 17 which is surrounded by coplanar nonrecessed portions 18 of the diaphragm bottom surface 16 that are peripheral to the recessed portion 17. It is contemplated that the recessed portion 17 of the conductive diaphragm will effectively function as a second capacitor electrode of the capacitive pressure transducer 10.

A first capacitive electrode 20 is bonded to said base substrate 11 with a top external surface 21 of the base electrode forming part of the base external top surface 12. The first electrode top external surface 21 is preferably planar and is surrounded by planar nonconductive portions 22 of the base top surface 12 wherein these nonconductive portions are coplanar with respect to each other. The coplanar nonrecessed portions 18 of the conductive diaphragm are bonded, preferably by anodic bonding techniques, to the coplanar nonconductive portions 22 of the base top surface 12, with the diaphragm 16 being substantially electrically isolated from the first capacitive electrode 20.

The first electrode top external surface 21 is positioned facing and spaced apart from the diaphragm recessed portion 17, and the first electrode top surface 21 is coplanar with the base top surface nonconductive coplanar portions 22. The first electrode 20 comprises a preformed metallic component which has at least portions hermetically embedded in the base substrate 11. The first electrode 20 has a conductive projecting portion 23, effectively integral with the first electrode top external surface 21, hermetically embedded within the base 11 and effectively extending from the first electrode top surface 21 through the base 11 to at least the base bottom surface 13, thereby providing an integral hermetically sealed feedthrough between the first electrode top surface comprising the surface 21 and the bottom surface 13 of the nonconductive base 11.

In accordance with the above described structure for the embodiment shown in FIG. 1, it can be seen that no film metallization need be applied to the top surface 12 of the base substrate in order to form the base capacitor electrode. Thus the step of film metallizing the base top surface 12 has been eliminated by the present invention. In addition, no film metallization nor any other type of additional feedthrough structure is required since the integral projecting portion 23 of the preformed metallic first conductor electrode 20 serves as an embedded solid feedthrough in the base 11, thereby permitting access to the base conductor electrode 20 from the bottom side of the base 11.

If desired, a noncritical film metallization 24 can be applied to the bottom surface 13 of the base 11 to facilitate making electrical contact to the first electrode projecting portion 23. Alternatively, the integral projecting portion 23 of the first electrode 20 can merely be extended beyond the base bottom surface 13, wherein this extension of the projecting portion 23 is indicated in phantom in FIG. 1 by element 25.

It should be noted that preferably the base substrate comprises a glass substrate to which the conductive silicon diaphragm 14 is anodically bonded thereto, preferably in accordance with the teachings of U.S. Pat. No. 4,384,899 to Myers, which patent is assigned to the same assignee as the present invention. Preferably the electrode 20 is provided by a preformed solid metal component. This component may or may not have a through hole opening within the projecting portion 23, such a through hole being illustrated in FIG. 3. Preferably the solid metal utilized for the electrode 20 is Kovar, Tungsten or any other suitable nickel alloy which may or may not be gold plated as required. The preformed metallic electrode 20 is hermetically embedded in the base substrate 11 as shown in FIG. 1.

In FIG. 1 a preformed metallic conductor pin 30 is also hermetically embedded in the base 11 and extends between said base top surface 12 and at least said base bottom surface 13. The metallic conductor 30 has a top end portion 31 which is coplanar with said base top surface coplanar portions 22 and the first electrode top external surface 21. The end portion 31 of the conductor 30 is electrically connected to the conductive silicon diaphragm 14 and effectively provides a base bottom surface feedthrough connection to the silicon diaphragm 14. This structure provides external electrical access to both the first capacitive electrode 20, mounted on the base 11, and the second capacitive electrode, formed by the silicon diaphragm 14, from the bottom surface 13 of the base 11. In many instances it is desirable to have access to both of these electrodes from the same surface, whereas in other applications access to the base electrode from the bottom surface 13 may be desired whereas access to the conductive silicon diaphragm 14 from its own top surface 15 may be desired.

As was the case with the integral projecting portion 23 of the first electrode 20, the metallic conductor 30 may be connected to film metallization 32 applied to the base bottom surface 13, or, as is shown in phantom, the metallic conductor 30 may extend beyond the bottom surface 13 as illustrated by the reference numeral phantom portion 33. Preferably the metallic conductor 30 is also formed by a metallic core, such as Kovar or Tungsten, wherein at least the end portion 31 of the conductor 30 is gold plated so as to assist in forming a silicon gold eutectic connection between the diaphragm 14 and the conductor 30. It is contemplated that this silicon gold eutectic connection is simultaneously formed during the anodic bonding process used to join the silicon diaphragm 14 to the base substrate 11. During this anodic bonding process, the diaphragm coplanar peripheral portions 18 surrounding the recessed portion 17 will be anodically bonded to the nonconductive coplanar portions 22 of the base top surface which surround the coplanar external top surface 21 of the first electrode.

It should be noted that during the anodic bonding process, a substantial electrostatic potential gradient is provided between the conductive silicon diaphragm 14 and the base substrate 11. Preferably this takes place at a substantially elevated temperature and results in the firm mechanical bonding of the silicon diaphragm 14 to the base substrate 11. The temperature at which the anodic bonding takes place is above the temperature at which a silicon gold eutectic is formed, and therefore the electrical connection of the pin 30 to the silicon diaphragm 14 is simultaneously formed during the anodic bonding process.

After the pressure transducer 10 shown in FIG. 1 has been constructed, it is contemplated that additional associated electronics will be connected to monitor capacitance changes which are provided in accordance with the pressure differential between external pressure applied to the top surface 15 of the silicon diaphragm 14 and pressure within an internal cavity 40 of the pressure transducer. The cavity 40 is bounded by the recessed portion 17 of the silicon diaphragm 14, the first electrode top external surface 21 and portions 26 of the coplanar base top surface portions 22 which surround the first electrode top external surface 21. For the embodiment in FIG. 1, a predetermined reference pressure will be stored in the internal cavity 40. This occurs because the anodic bonding process provides a hermetic seal between the base substrate 11 and the diaphragm 14, and this bonding takes place at a predetermined ambient reference pressure, preferably a partial vacuum. After the transducer 10 is fabricated, as external pressure is applied to the top surface 15 of the diaphragm 14, the spacing between the silicon diaphragm recessed portion 17 and the first electrode 20 will vary, thereby altering the capacitance between these two conductive elements. This variation in capacitance will be utilized by external monitoring circuitry to preferably generate an electrical signal indicative of the pressure applied to the surface 15 as measured with respect to the reference pressure stored within the cavity 40. Of course it is understood that the pressure transducer 10 is contructed such that the conductive diaphragm means is substantially electrically isolated from the first capacitive electrode 20 so that a proper capacitance measurement can be obtained without substantial leakage resistance being present. This is ensured by providing that the silicon diaphragm 14 does not contact the first electrode 20 and that the planar peripheral portions 18 of the silicon diaphragm are spaced sufficiently apart from the top external surface 21 of the first capacitor base electrode 20.

By virtue of the construction of the transducer 10 shown in FIG. 1 it is apparent that no top surface film metallization of the base 11 is required. In addition, no additional feedthrough apparatus or connection is required to provide external electrical access to the first capacitor electrode 20. In addition the metallic conductor 30 permits bottom surface electrical access to the conductive silicon diaphragm, and this is often times desired. Additionally, since the external top surface 21 of the base electrode, and the surrounding peripheral portions 22 of the base top surface 12 are coplanar, greater control can be exercised with respect to constructing pressure transducers which have a relatively narrow range of nominal capacitance. This is because there is no film thickness on the base top surface 12 for the base capacitor electrode 20 which will cause nominal capacitance variations when the pressure transducers 10 are mass manufactured. Also the metallizing equipment previously utilized to provide precise electrode metallization patterns on the base top surface 12 is now no longer required.

Preferably, a subassembly comprising the base 11, the first conductor electrode 20 and the metallic conductor 30 is initially fabricated. Then the subassembly is anodically bonded to the silicon diaphragm 14 which has been previously been etched to provide the recessed portion 17. Prior to the anodic bonding process, the top surface of the subassembly has been ground flat to ensure tighter control on the nominal capacitance provided by the pressure transducer 10.

While a top view of the pressure transducer 10 shown in FIG. 1 is not illustrated, it is understood that the pressure transducer could be either cylindrical in general shape or rectangular and still provide the same cross sectional view shown in FIG. 1. In addition, it should be noted that preferably the pressure transducer 10 will be multiply produced by utilizing a single glass plate with many embedded electrodes and metallic conductors to form a plurality of base substrate subassemblies. These subassemblies are then mated to a silicon wafer on which a plurality of mating recessed portions 17 are formed. Then the composite assemblies formed thereby can be individually separated by various dicing techniques such as diamond or laser scoring.

Preferrably the subassembly comprising the base substrate 11, the preformed metallic first capacitor electrode 20, the preformed metallic conductor 30 and any additional preformed metallic conductors, such as 71, 72 and 73 in FIG. 4, can be provided as follows. Initially a solid glass plate is provided and preformed metallic pins corresponding to the elements 20, 30, 71, 72 and 73 are fixtured above the glass plate in desired positions. Weight is provided to the fixtured pins by means of some fixturing apparatus so that they press against a surface of the glass plate. The glass plate is then sent through a high temperature furnace having a suitable controlled atmosphere to provide optimum pin to glass bonds. This causes the glass to soften, and the pins, by virtue of the fixtured weight, to push through the glass plate into desired final positions. After the furnace firing a hermetically sealed subassembly is provided, and subsequently the top surface of this subassembly is ground flat. In this manner the subassembly of the present invention can preferably be provided. However other known techniques of embedding preformed metallic conductors in a nonconductive base could also be used.

Figure 2:
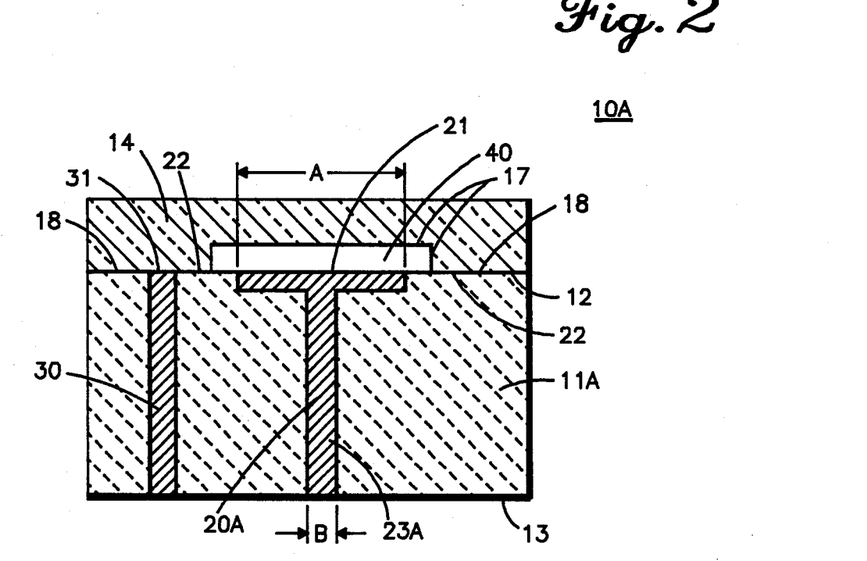
FIG. 2 is a cross sectional view of an additional pressure transducer embodiment.

FIG. 2 illustrates a pressure transducer 10A which represents a variation of the pressure transducer 10 shown in FIG. 1. All identical corresponding components of the transducers 10 and 10A are identified by identical reference notation. Components identified by identical reference numbers with different alphabetic suffixes are corresponding, but not identical, components. This notation is used for all of the drawings herein.

For the transducer 10A the primary difference from the transducer 10 comprises providing a reduced lateral cross sectional dimension B for the integral projecting portion 23A of the base first capacitor electrode 20A. In FIG. 2, the first capacitive electrode external surface 21 has a first lateral dimension A in the plane of the nonconductive coplanar top surface portions 22 of the base 11A. This is contrasted with a substantially reduced parallel lateral cross sectional dimension B for the integral projecting portion 23A of the first capacitive electrode 20A, in FIG. 2. This configuration results in the electrode 20A having a nail head type structure. In all other respects, the pressure transducer 10A in FIG. 2 corresponds to the pressure transducer 10 in FIG. 1. The advantage of the structure of the embodiment shown in FIG. 2 is that less metal is used thereby minimizing any thermal mismatch problems between the first capacitive electrode 20A and the insulating base 11A in which it is embedded. Typically the lateral dimension A is twice the dimension B. It should be noted that typically a substantial dimension for the dimension A maybe required to obtain the desired magnitude of nominal capacitance for the pressure transducer.

It should be noted that the nail head configuration for the preformed metallic electrode 20A could be obtained by welding a solid pin, corresponding to projecting portion 23A, to an extended metal head portion. However this would still form a preformed metallic component which is to be embedded in the base 11, and the portion 23A would still be effectively integral with the head portion forming top surface 21.

Figure 3:
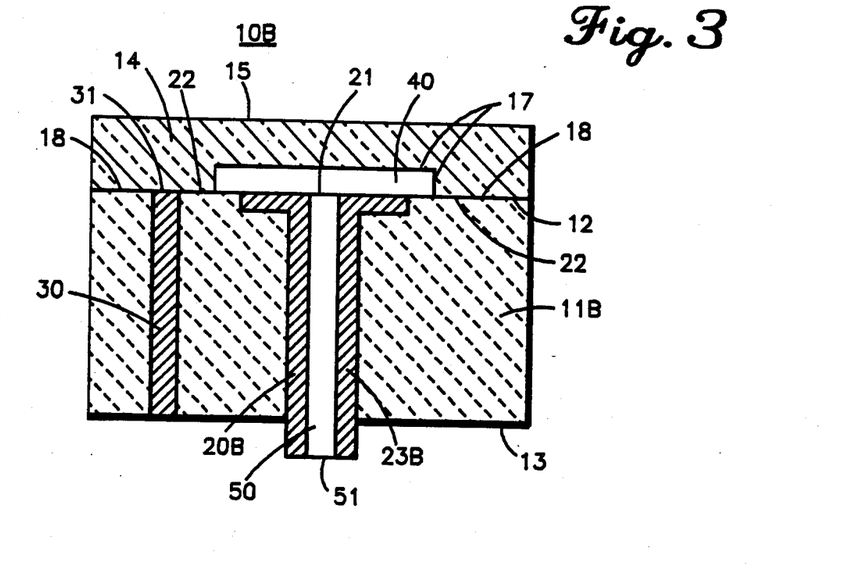
FIG. 3 is a cross sectional view of still another pressure transducer embodiment.

Referring now to FIG. 3, another pressure transducer embodiment is illustrated. In FIG. 3 a pressure transducer 10B is illustrated which again generally corresponds to the pressure transducers 10 and 10A. However, now a first electrode integral projecting portion 23B is provided which includes a through path opening 50 therein. The projecting portion 23B generally corresponds to the projecting portion 23A in FIG. 2. The through path opening 50 extends from at least the base bottom surface 13 through the base 11B and into the internal cavity 40. Actually, as is shown in FIG. 3, preferably the projecting portion 23B extends beyond/below the bottom surface 13 of the base 11B. The above described configuration permits the pressure transducer 10B to be utilized as a differential pressure transducer since one pressure can be applied to the surface 15 of the silicon diaphragm 14 while another pressure can be applied to the internal cavity 40 by virtue of the through hole opening 50. In addition, the configuration in FIG. 3 can also be used to provide a fixed predetermined reference pressure within the internal cavity 40 after the silicon diaphragm 14 has been anodically bonded to the base 11B. In this case, after anodic bonding a predetermined reference pressure is applied for storage in the cavity 40 by virtue of the through path opening 50. Then an exposed end 51 of the projecting portion 23B could be sealed.

The advantages of the structure shown in FIG. 3 are that no additional top surface area of the base substrate 11B need be utilized to provide this through path opening to the internal cavity 40, and that no through path separate from the electrical feedthrough need be provided in the base 11B. This minimizes the lateral dimensions of the pressure transducer 10B. Also the cost of manufacturing the transducer 10B is minimized, since providing a through path to the cavity 40 only involves utilizing a preformed base electrode 20B with a center hole.

Figure 4:
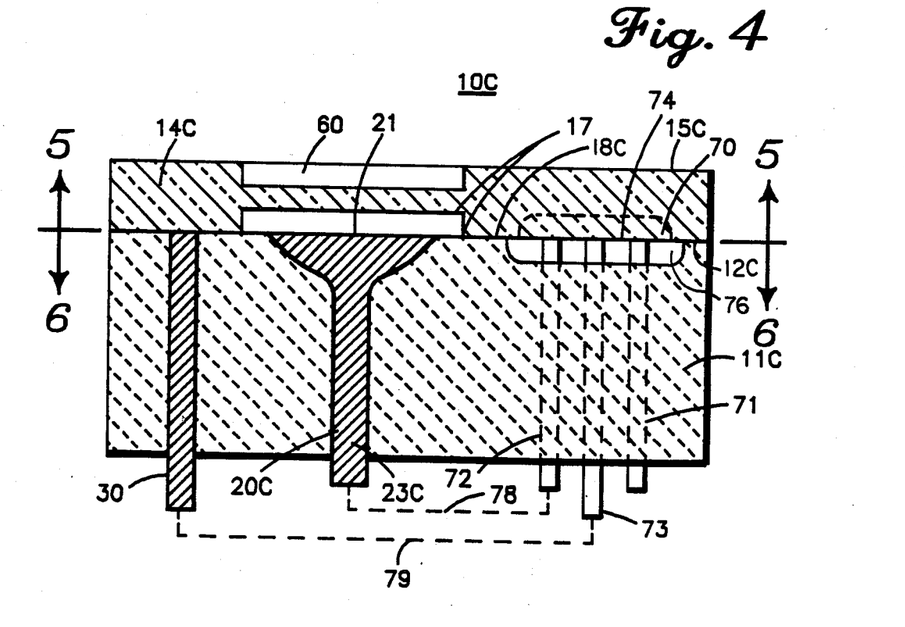
FIG. 4 is a cross sectional view of another pressure transducer embodiment.
Figure 5:
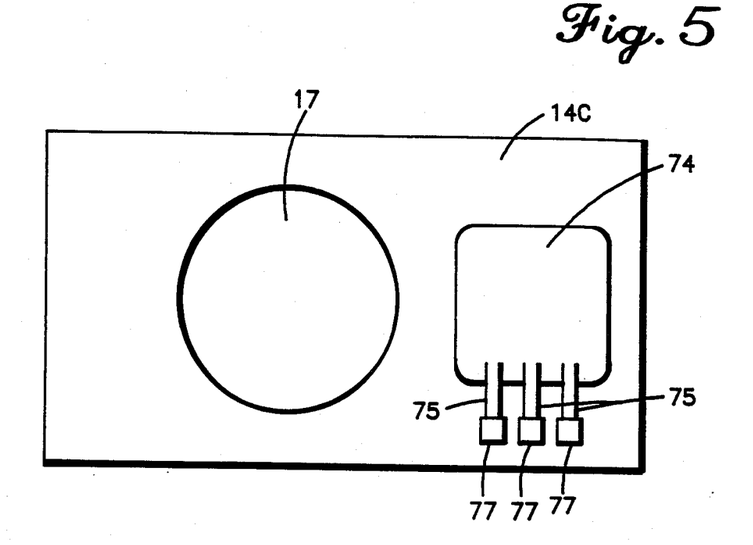
FIG. 5 is a bottom plane view of the diaphragm of the FIG. 4 transducer taken along lines 5—5.
Figure 6:
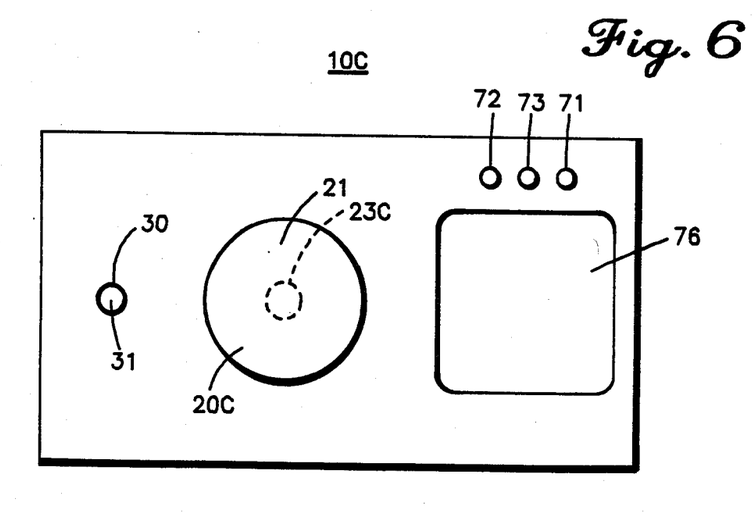
FIG. 6 is a top plane view of a base substrate subassembly for the embodiment shown in FIG. 4 taken along lines 6—6 in FIG. 4.

Referring to FIGS. 4-6 an additional pressure transducer 10C is illustrated. FIG. 4 shows a cross sectional view of the transducer 10C, with FIG. 5 showing a bottom plane view of diaphram 14C and FIG. 6 showing a top plane view of base 11C with preformed metal components already embedded therein and therefore forming a base substrate subassembly. In the transducer 10C, the first capacitor electrode 20C is illustrated as again comprising a somewhat reduced lateral cross section dimension projecting portion 23C which more gradually expands into the nail head structure of the first capacitor electrode 20C which has an extended lateral dimension for the external top electrode surface 21. For the transducer 10C shown in FIG. 4, the top surface 15C of the silicon diaphragm 14C has an additional recessed portion 60 which is substantially coextensive with the bottom surface recessed portion 17. In this manner, a more sensitive pressure transducer can be provided by minimizing the thickness of the portion of the silicon diaphragm which will deflect in response to applied pressure. This is achieved without substantially jeopardizing the ruggedness of the silicon diaphragm 14C prior to its anodic bonding to the base substrate 11. This is because the areas surrounding the recessed portions 17 and 60 of the silicon diaphragm are not recessed thereby providing thicker portions of the silicon diaphragm surrounding the critical recessed portions 17 and 60. Providing the recessed portions 17 and 60 can readily be achieved by double sided etching of a silicon wafer.

FIGS. 4–6 illustrate that for the pressure transducer 10C it is contemplated that active and passive semiconductor components are synthesized in an area 70 which is part of the silicon diaphragm 14C. These components can be synthesized by utilizing standard semiconductor manufacturing technology. External connection to these components, which includes electrical components which respond to and process the variable pressure related capacitance produced by the pressure transducer 10C, is made by preformed conductive metallic pins 71, 72 and 73 which are hermetically embedded in the base 11C and function similarly to the conductive metal pin 30. Preferably, there will be no contact between the top surface 12C of the base substrate 11C and a critical surface area 74, part of surface 18C, on the silicon diaphragm 14C, wherein beneath this critical surface area electrical components are provided on the silicon diaphragm. However, electrical connection is made to these components by virtue of providing conductive paths 75 which extend from inside to outside of this critical surface area 74, these paths 75 provided on the bottom surface of the silicon diaphragm 14C. Connection to the conductive paths 75, and therefore to the components within the area 70, is provided by virtue of the embedded conductor pins 71–73 which are connected to the paths 75 outside of the critical surface area 74. In order to prevent potential damage to the critical surface area 74 and the components in the area 70, a recessed portion 76 is provided in the top surface 12C of the base substrate 11C wherein this recessed portion 76 is coextensive with, and actually somewhat larger in area than, the critical silicon bottom surface area 74. The conductor pins 71–73 are laterally positioned outside of the critical silicon surface area 74 and the recessed portion 76, and the conductive paths 75 are provided on the bottom silicon surfaces 74 and 18C in accordance with standard semiconductor processing techniques. The paths 75 terminate outside of the critical area 74 at bonding pads 77. The pads 77 are connected to corresponding end portions of the pins 71–73 which have been ground flat so that they are substantially coplanar with the base top surface 12C. This connection can be implemented by forming a silicon gold eutectic during anodic bonding, or by other bonding metallurgies.

It should be noted that, if desired, connection can be made by an external conductive path 78 between the first conductor electrode 20C and one of the conductor pins 72 connected to the circuit electronics provided in the active area 70 on the silicon diaphragm 14C. This technique enables providing the entire pressure transducer electronics in a single module with the electronics being contained on the diaphragm 14C. In this situation an electrical signal representative of the changes in capacitance produced by sensed pressure can be preferably provided on the embedded pin 71 as an output signal of the electronics contained in the active area 70. Connection of the electronics in area 70 to the second capacitor electrode formed by the diaphragm 14C could be provided in a similar manner by the embedded pin 73 being externally connected to the pin 30 by the conductive path 79 shown in phantom in FIG. 4. Also connection of the components in area 70 to the silicon diaphragm second electrode is possible by virtue of the fact that an existing connection is inherently possible due to the fact that the second capacitor electrode is formed by the conductive silicon which also surrounds the active silicon area 70 on the silicon diaphragm 14C.

For the transducer embodiment shown in FIGS. 4–6, a complete pressure transducer module has been provided in which connections between the pressure sensing elements, the capacitor electrodes, and the circuit electronics have been facilitated by eliminating the need to create wire bond connections to the electrical components synthesized in the silicon area 70. These techniques could also be utilized for PRT (piezoresistive transducers) which may be used for sensing pressure or other physical quantities. While we have shown and described specific embodiments of the present invention, further modifications and improvements will occur to those skilled in the art. All such modifications of the present invention which retain the basic underlying principles disclosed and claimed herein are within the scope of this invention.

We claim:

1. A capacitive pressure transducer comprising:
   a nonconductive base having external top and other surfaces,
   a conductive first capacitive electrode bonded to said base and having a top external surface forming part of said base external top surface, the first electrode top external surface effectively substantially surrounded by nonconductive coplanar portions of said base top surface, and
   diaphragm means having top and bottom surfaces with said diaphragm bottom surface joined to said base top surface, a recessed portion of said diaphragm bottom surface spaced apart from and facing said first capacitive electrode top external surface and forming a second capacitive electrode movable with respect to said first electrode in response to sensed pressure variations, coplanar nonrecessed portions of said diaphragm bottom surface peripheral to said recessed portion being bonded to said nonconductive coplanar portions of said base top surface,
   said first electrode comprising a preformed metallic component embedded in said base, said first electrode top external surface being coplanar with said base top surface nonconductive coplanar portions, and said first electrode having a conductive projecting portion, effectively integral with said first electrode top external surface, embedded in said base and effectively extending from said first electrode top external surface through said base to at least said base other surface.

2. A capacitive pressure transducer according to claim 1 wherein said other base surface comprises a bottom base surface which is spaced from and substantially parallel to said top base surface.

3. A capacitive pressure transducer according to claim 2 wherein said first capacitive electrode top external surface has a first lateral dimension in the plane of said nonconductive coplanar top surface portions of said base, and wherein said integral projecting portion of said first electrode has a substantially reduced parallel lateral cross sectional dimension thereby effectively forming a nail head type structure.

4. A capacitive pressure transducer according to claim 1 wherein said integral projecting portion of said first electrode includes a through path opening present within said projecting portion and extending from at least said base other surface to said first electrode top external surface and into an internal cavity substantially bounded by said recessed portion of said diaphragm means, said first electrode top external surface and portions of said coplanar base top surface portions surrounding said first electrode top external surface.

5. A capacitive pressure transducer according to claim 1 wherein said top surface of said diaphragm means has an additional recessed portion substantially coextensive with said bottom surface recessed portion.

6. A capacitive pressure transducer according to claim 1 wherein said diaphragm means is conductive and is substantially electrically isolated from said first capacitive electrode.

7. A capacitive pressure transducer according to claim 6 wherein said conductive diaphragm means is formed from silicon.

8. A capacitive pressure transducer according to claim 7 which includes a preformed metallic conductor means embedded in said base and extending between said base top surface and at least said other base surface and having a top end portion coplanar with said base top surface coplanar portions and said first electrode top external surface, said end portion of said metallic conductor means being electrically connected to said conductive silicon diaphragm means.

9. A capacitive pressure transducer according to claim 8 wherein said metallic conductor means comprises a solid integral metal pin embedded in said base.

10. A capacitive pressure transducer according to claim 1 wherein said diaphram coplanar peripheral portions surrounding said recessed portion are anodically bonded to said nonconductive coplanar portions of said base top surface.

11. A capacitive pressure transducer comprising:
a nonconductive base having external top and other surfaces,
a conductive first capacitive electrode bonded to said base and having a top external surface forming part of said base external top surface, the first electrode top external surface effectively substantially surrounded by nonconductive coplanar portions of said base top surface, and
diaphragm means having top and bottom surfaces with said diaphragm bottom surface joined to said base top surface, a recessed portion of said diaphragm bottom surface spaced apart from and facing said first capacitive electrode top external surface and forming a second capacitive electrode movable with respect to said first electrode in response to sensed pressure variations, coplanar nonrecessed portions of said diaphragm bottom surface peripheral to said recessed portion being bonded to said nonconductive coplanar portions of said base top surface,
said first electrode comprising a preformed metallic component embedded in said base, said first electrode top external surface being coplanar with said base top surface nonconductive coplanar portions, and said first electrode having a conductive projecting portion, effectively integral with said first electrode top external surface, embedded in said base and effectively extending from said first electrode top external surface through said bae to at least said base other surface,
wherein said first capacitive electrode top external surface has a first lateral dimension in the plane of said nonconductive coplanar top surface portions of said base, and wherein said integral projecting portion of said first electrode has a substantially reduced parallel lateral cross sectional dimension thereby effectively forming a nail head type structure.

12. A capacitive pressure transducer comprising:
a nonconductive base having external top and other surfaces,
a conductive first capacitive electrode bonded to said base and having a top external surface forming part of said base external top surface, the first electrode top external surface effectively substantially surrounded by nonconductive coplanar portions of said base top surface, and
diaphragm means having top and bottom surfaces with said diaphragm bottom surface joined to said base top surface, a recessed portion of said diaphragm bottom surface spaced apart from and facing said first capacitive electrode top external surface and forming a second capacitive eletrode movable with respect to said first electrode in response to sensed pressure variations, coplanar nonrecessed portions of said diaphragm bottom surface peripheral to said recessed portion being bonded to said nonconductive coplanar portions of said base top surface,
said first electrode comprising a preformed metallic component embedded in said base, said first electrode top external surface being coplanar with said base top surface nonconductive coplanar portions, and said first electrode having a conductive projecting portion, effectively integral with said first electrode top external surface, embedded in said base and effectively extending from said first electrode top external surface through said base to at least said base other surface,
wherein said diaphragm means is conductive and is substantially electrically isolated from said first capacitive electrode,
which includes a preformed metallic conductor means embedded in said base and extending between said base top surface and at least said other base surface and having a top end portion coplanar with said base top surface coplanar portions and said first electrode top external surface, said end portion of said metallic conductor means being electrically connected to said conductive silicon diaphragm means,
wherein said metallic conductor means comprises a solid integral metal pin embedded in said base, and
wherein said first capacitive electrode comprises a metal pin having an extended nail head end portion forming said capacitive first electrode top external surface.

13. A capacitive pressure transducer according to claim 12 wherein said nail head portion of said first capacitive electrode top external surface has a first lateral dimension in the plane of said coplanar top surface portions of said base, and wherein said integral projecting portion of said first electrode comprises an effectively integral metal extension, from said nail head end portion, having a substantially reduced parallel lateral cross sectional dimension thereby forming said nail head structure of said first capacitive electrode.

14. A capacitive pressure transducer according to claim 13 wherein said integral projecting portion of said first electrode has a through path present within said projecting portion, said through path extending from at least said other surface of said base into an internal cavity substantially bounded by said recessed portion of said diaphragm means, said first electrode top external surface and portions of the coplanar base top surface portions surrounding said first electrode top external surface.

15. A capacitive pressure transducer according to claim 13 wherein said preformed metallic conductor means embedded in said base is formed by a metallic core such as Kovar or Tungsten, and wherein at least said end portion of said embedded conductor means has been gold plated with said gold plating forming a silicon gold eutectic electrical connection between said core and said silicon diaphragm.

16. A capacitive pressure transducer according to claim 15 wherein said diaphram coplanar peripheral portions surrounding said recessed portion are anodically bonded to said nonconductive coplanar portions of said base top surface.

* * * * *